(12) United States Patent
Breisch (10) Patent No.: US 7,959,384 B2
(45) Date of Patent: Jun. 14, 2011

(54) TOOL FOR CHIP REMOVING MACHINING AND A BASIC BODY THEREFOR

(75) Inventor: Anders Breisch, Sandviken (SE)

(73) Assignee: Sandvik Intellectual Property AB, Sandviken (SE)

( * ) Notice: Subject to any disclaimer, the term of this patent is extended or adjusted under 35 U.S.C. 154(b) by 743 days.

(21) Appl. No.: 11/979,892

(22) Filed: Nov. 9, 2007

(65) Prior Publication Data

US 2008/0124180 A1 May 29, 2008

(30) Foreign Application Priority Data

Nov. 28, 2006 (SE) ...................................... 0602558

(51) Int. Cl.
*B26D 1/00* (2006.01)

(52) U.S. Cl. ............ 407/110; 407/11; 407/91; 407/109; 407/113

(58) Field of Classification Search .................... 407/11, 407/91, 111, 110, 113
See application file for complete search history.

(56) References Cited

U.S. PATENT DOCUMENTS

| | | | | |
|---|---|---|---|---|
| 3,889,520 | A | * | 6/1975 | Stoferle et al. ................. 73/37.5 |
| 4,621,547 | A | * | 11/1986 | Yankoff ......................... 82/1.11 |
| 5,340,242 | A | * | 8/1994 | Armbrust et al. .............. 407/11 |
| 5,709,508 | A | * | 1/1998 | Barazani et al. ............. 407/101 |
| 6,312,199 | B1 | * | 11/2001 | Sjoden et al. .................... 407/11 |
| 6,705,805 | B2 | * | 3/2004 | Lagerberg ....................... 407/11 |
| 6,814,526 | B2 | * | 11/2004 | Shiraiwa et al. .............. 407/110 |
| 7,703,359 | B2 | * | 4/2010 | Englund ........................ 82/1.11 |
| 2002/0189413 | A1 | * | 12/2002 | Zurecki et al. ................. 82/1.11 |
| 2007/0283794 | A1 | * | 12/2007 | Giannetti ........................ 82/158 |
| 2008/0083307 | A1 | * | 4/2008 | Giannetti ........................ 82/157 |

FOREIGN PATENT DOCUMENTS

| | | | |
|---|---|---|---|
| DE | 3740814 A | * | 6/1989 |
| DE | 4028361 A1 | | 3/1991 |
| EP | 1 524 053 A2 | | 4/2005 |
| JP | 59073257 A | * | 4/1984 |
| JP | 02198705 A | * | 8/1990 |
| JP | 7-237008 | | 9/1995 |
| JP | 08025110 A | * | 1/1996 |
| JP | 08025111 A | * | 1/1996 |
| RO | 102 494 B1 | | 2/1992 |
| WO | WO 96/12592 | | 5/1996 |
| WO | WO 00/53362 | | 9/2000 |
| WO | WO 2004/080631 | | 9/2004 |

* cited by examiner

*Primary Examiner* — Jason Daniel Prone
*Assistant Examiner* — Jennifer Swinney
(74) *Attorney, Agent, or Firm* — Drinker Biddle & Reath, LLP (57) ABSTRACT

In an embodiment, the invention provides a tool for chip removing machining, including a replaceable cutting insert and a basic body. The basic body includes a rear fixing part, a front supporting part having an insert seat, and a tightening part spaced apart from the front supporting part by a first gap and from the rear fixing part by a second gap. The tightening part is connected to the basic body via a joint around which the tightening part is pivoted to press the cutting insert against the insert seat by a front finger. The rear fixing part includes a first channel having an inlet and an outlet for feed of a fluid toward the cutting insert. The tightening part includes an internal, second channel that extends between an inlet and an outlet. A hollow coupling member extends between the tightening part and one of the rear fixing part and the front supporting part while bridging the respective gap to establish a fluid communication path between the outlet of the first channel and the inlet of the second channel.

19 Claims, 5 Drawing Sheets

TOOL FOR CHIP REMOVING MACHINING AND A BASIC BODY THEREFOR

This application claims priority under 35 U.S.C. §119 to Swedish Patent Application No. 0602558-9, filed on Nov. 28, 2006, the disclosure of which is incorporated by reference herein in its entirety.

FIELD OF THE INVENTION

The present invention relates generally to a tool for chip removing machining of the type that includes a replaceable cutting insert and a basic body. The basic body includes a rear fixing part, a front supporting part having an insert seat in which the cutting insert is placed, and a tightening part. The tightening part is spaced-apart from the two other parts via two gaps and connected to the rest of the basic body via a joint. The tightening part is pivotable around the joint to press the cutting insert against the insert seat by a front finger. The fixing part includes a channel that has an inlet and an outlet for feed of a fluid toward the cutting insert. The present invention also relates to a basic body for such tools. The invention is particularly applicable and advantageous in connection with turning tools.

BACKGROUND OF THE INVENTION

Turning tools of the above generally mentioned type are usually used for machining workpieces of metal, preferably by parting, grooving and profile turning. For the turning operations, it is desirable to use as slender cutting inserts as possible, in order to generate the thinnest possible grooves, thereby minimizing material losses and energy consumption. This means that the front portion of the support part under the cutting insert, as well as the front finger of the tightening part above the cutting insert have to be designed utmost slender or thin to be accommodated in the groove in the workpiece recessed by the cutting insert.

As a consequence of, on one hand, the fact that the front portions of the support and tightening parts of the basic body have to be slender, and on the other hand the fact that the movable tightening part is connected to the rest of the basic body via a thin, elastic material portion serving as a joint, difficulties arise in cooling the cutting insert in an efficient way. Thus, the cooling of previously known grooving and parting tools, respectively, has been effected in an inefficient and almost provisional way, more precisely by two pipe conduits routed from the rear fixing part of the basic body (or a tool holder connected with the basic body), situated externally to the basic body, and ending in outlets situated far from the cutting insert. De facto, an upper conduit for cooling the cutting insert from above mouths approximately in flush with the topside of the tightening part, while a lower conduit for cooling the cutting insert from below mouths at a point situated approximately halfway between the cutting insert and the underside of the support part. In order to improve the cooling of the cutting insert and furthermore avoid the need of the space-requiring external pipe conduits and associated problems, attempts have been made to form the requisite cooling-liquid conduits in the form of internal channels in the proper basic body. However, these attempts have had limited success so far that internal channels having a sufficient cross-section area indeed have been producible in the support part stiffly integrated with the fixing part, but not in the pivotably movable tightening part, which, with the exception of the thin, elastic joint, is spaced-apart from the fixing part as well as the support part via open gaps. In other words, it has previously only been practically possible to provide undercooling of the cutting insert via internal cooling-liquid channels, but not overcooling.

The cooling of the previously known tools has been effected using large quantities of flushing low-pressure cooling liquid (about a pressure of 10 bar), in spite of the development of the cooling technique within the area of cutting machining increasingly being pushed in the direction of using high-pressure liquid. Thus, numerous tools for chip removing machining have recently been designed for cooling-liquid pressures within the range of 400-1000 bar or more.

The present invention aims at obviating the above-mentioned shortcomings of previously known cutting tools, in particular turning tools for, for instance, grooving and parting purposes, and at providing an improved tool. Therefore, an object is to provide a tool having the capability of cooling the cutting insert in an efficient way not only from below but in particular also from above, without the tool needing to be cluttered up with external conduit pipes for the cooling liquid. An additional object is to provide a turning tool having the capability of cooling the topside of the cutting insert by a highpressure liquid jet, which has accurate precision in respect of the point of impact thereof against the cutting insert. In particular, the invention aims at allowing the formation of a so-called hydraulic wedge between the chip surface of the cutting insert and the chip partly broken away, wherein the cooling effect of the jet of liquid even may be of secondary interest in comparison with the chip-breaking effect thereof. A parallel object of the invention is to provide an improved chip evacuation during grooving or parting by the tool. Yet another object of the invention is to provide a tool, the improved cooling and chip-forming capacity of which does not intrude on the capability of the tightening part to distinctly fix the cutting insert in the insert seat. In other words, a high-pressure cooling liquid or fluid should be introducible into the tightening part without detrimentally affecting the delicate joint between the tightening part and the rest of the basic body.

SUMMARY OF THE INVENTION

In an embodiment, the invention provides a tool for chip removing machining, including a replaceable cutting insert and a basic body. The basic body includes a rear fixing part, a front supporting part having an insert seat, and a tightening part spaced apart from the front supporting part by a first gap and from the rear fixing part by a second gap. The tightening part is connected to the basic body via a joint around which the tightening part is pivoted to press the cutting insert against the insert seat by a front finger. The rear fixing part includes a first channel having an inlet and an outlet for feed of a fluid toward the cutting insert. The tightening part includes an internal, second channel that extends between an inlet and an outlet. A hollow coupling member extends between the tightening part and one of the rear fixing part and the front supporting part while bridging the respective gap to establish a fluid communication path between the outlet of the first channel and the inlet of the second channel.

In another embodiment, the invention provides a basic body for tools for chip removing machining, including a rear fixing part, a front supporting part having a cutting insert seat, and a tightening part spaced apart from the front supporting part by a first gap and from the rear fixing part by a second gap. The tightening part is connected to the basic body via a joint around which the tightening part is pivoted to press a front finger toward the cutting insert seat. The rear fixing part includes a first channel having an inlet and an outlet for feed of a fluid toward the cutting insert seat. The tightening part includes an internal, second channel that extends between an inlet and an outlet. A hollow coupling member extends between the tightening part and one of the rear fixing part and the front supporting part while bridging the respective gap to establish a fluid communication path between the outlet of the first channel and the inlet of the second channel.

The idea behind the invention is to lead in cooling liquid, in particular high-pressure cooling liquid, into the pivotably movable tightening part of the tool via a hollow coupling member, which intersects either the gap separating the tightening part from the subjacent support part, or the gap separating the tightening part from the fixing part of the basic body. In the coupling member, which advantageously may be a pipe piece, there is a central hole from which the cooling liquid can pass out via radial holes, which mouth in a ring-shaped space between two axially spaced-apart, elastic sealing rings. An internal channel runs inside the tightening part between an inlet mouth between the sealing rings and an outlet mouth in the front tightening finger of the tightening part.

The liquid pressure may—in a preferred embodiment—apply equally large, but counter-directed forces to the sealing rings. In such a way, the forces are outbalanced so that the coupling member does not apply a compressive force to the tightening part, which could jeopardize the clamping of the cutting insert, in spite of the fact that the liquid pressure may be very high, e.g., of 400 bar or more. However, it is also possible to arrange the sealing rings in such a way that the liquid pressure is utilized to apply a tightening force to the tightening part.

BRIEF DESCRIPTION OF THE DRAWINGS

The accompanying drawings, which are incorporated herein and constitute part of this specification, illustrate the presently preferred embodiments of the invention, and together with the general description given above and the detailed description given below, serve to explain features of the invention.

DETAILED DESCRIPTION OF THE PREFERRED EMBODIMENTS

Figure 1:
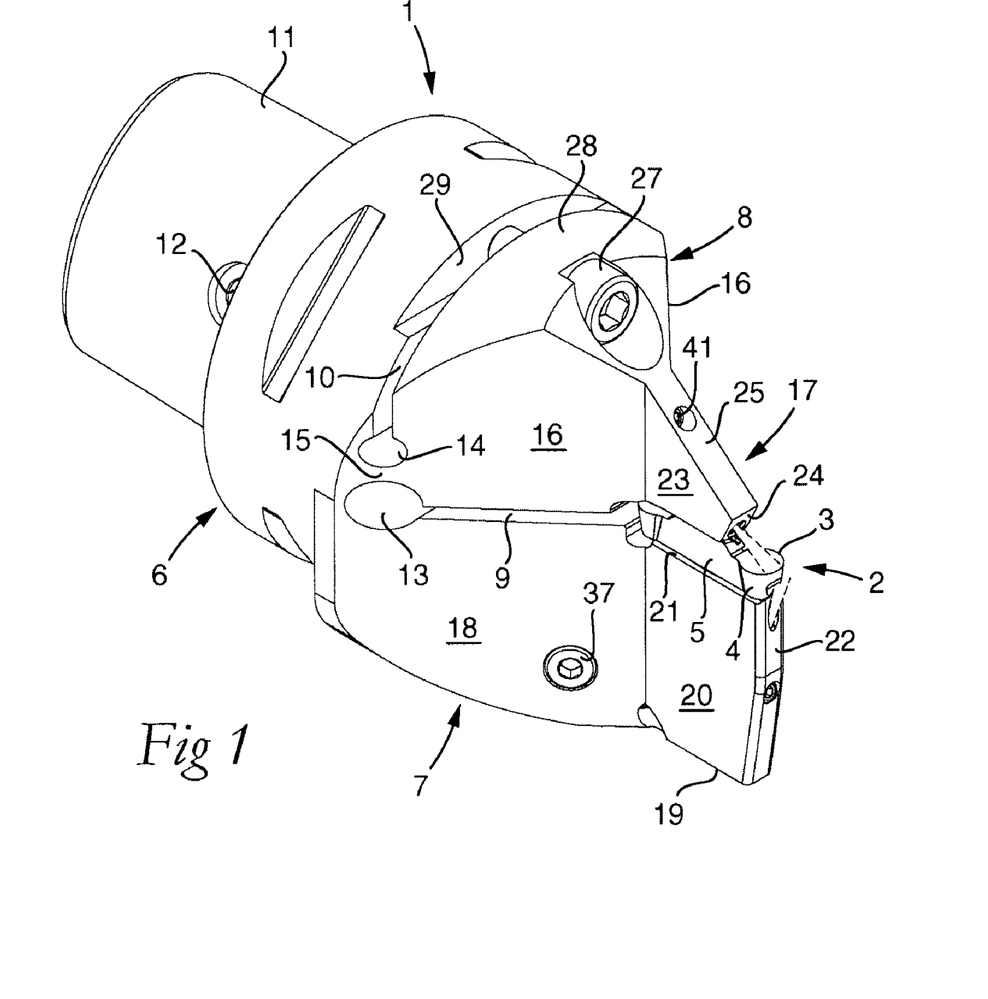
FIG. 1 is a perspective view of a turning tool according to an embodiment of the invention.
Figure 2:
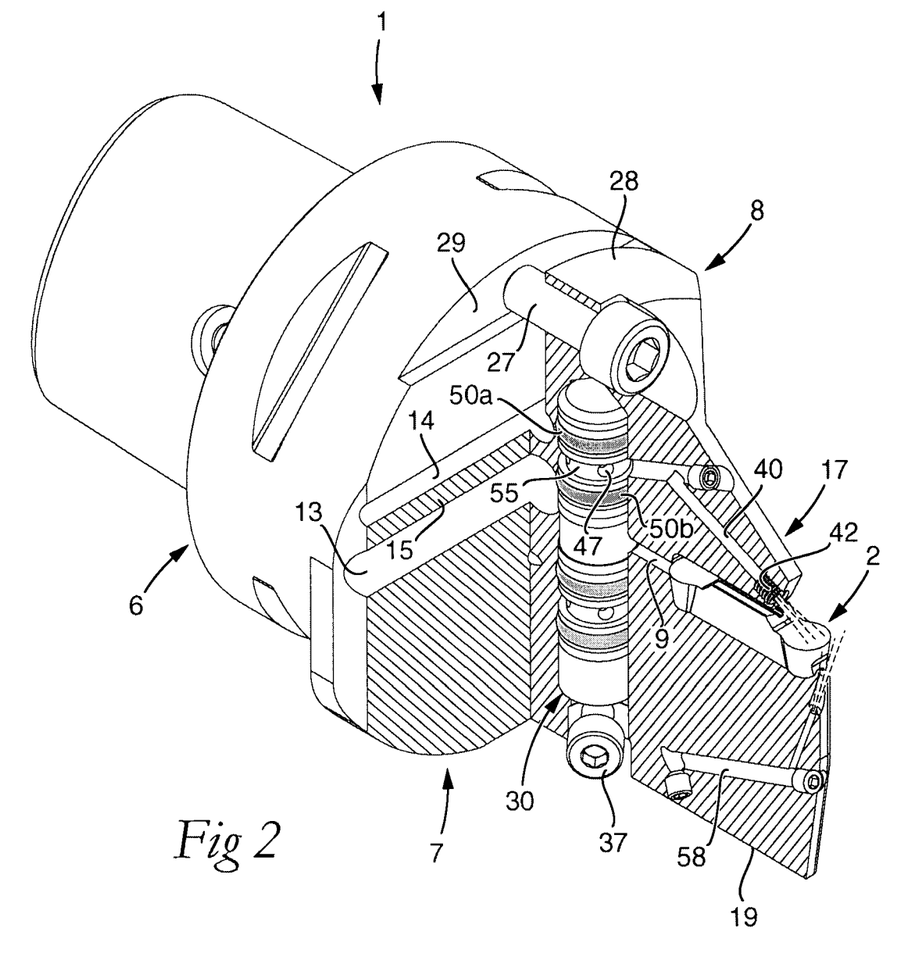
FIG. 2 is a partly sectioned perspective view showing parts of the interior of the tool in FIG. 1.

In FIG. 1, a turning tool is shown that in practice can be used for parting, grooving and profile turning. The main components of the tool are a basic body, in its entirety designated 1, and a replaceable cutting insert 2. In this case, the cutting insert has an elongate basic shape and is indexable in two positions by including a pair of opposite, circular cutting edges 3, which are formed on round material portions 4 having a downwardly tapering shape. The intermediate portion 5 of the cutting insert, which extends between the two opposite ends, has a width or thickness that is smaller than the diameter of the cutting edges 3.

In this connection, the basic body 1 suitably is manufactured from steel or the like, while the replaceable cutting insert 2 is manufactured from cemented carbide or other hard and wear-resistant materials.

The basic body 1 includes a rear fixing part 6, a front supporting part 7, and a tightening part 8 situated above the support part 7, and in front of the fixing part 6. From the support part 7, the tightening part 8 is spaced-apart by a first, substantially horizontal gap 9, while a second, vertical gap 10 separates the tightening part from the fixing part 6. In the fixing part 6, a rearwardly directed male member 11 is included that is insertable into a co-operating seating in a machine tool to couple together the tool with the machine. In this case, the male member 11 is included in a coupling of the type that is commercially available under the trademark COROMANT CAPTO®. Inside the fixing part 6, a system of channels is formed to which cooling liquid, in particular high-pressure cooling liquid, can be supplied via one or more inlets 12.

Hollow spaces 13, 14 extend continuously between the opposite sides of the basic body and, in this case, form inner terminations of the gaps 9, 10, and which are spaced-apart from each other via a material portion 15, which by virtue of the small thickness thereof (e.g., 2 to 3 mm) to a certain extent is elastically resilient. Due to the elasticity, material portion 15 can serve as a joint around which the tightening part 8 can make moderate pivoting motions. The hollow spaces 13, 14 are most suitably cylindrical borings in which the gaps 9, 10 mouth. Via inclined side surfaces 16, the tightening part 8 tapers in the forward direction toward a finger designated 17, which has the purpose of clamping the cutting insert 2 in the desired position. Via analogous side surfaces 18, the support part 7 tapers in the forward direction toward a front material portion 19 in the form of a flat, supporting bracket. The bracket 19 is delimited by a pair of opposite side surfaces 20 that suitably are plane and mutually parallel. The topside 21 of the bracket 19 forms an insert seat against which the underside of the cutting insert 2 rests. In front, the bracket 19 is delimited by a front-end surface 22. The finger 17 is also delimited by a pair of opposite side surfaces 23 that advantageously are plane and mutually parallel. A front end surface designated 24 forms a transition between the topside 25 of the finger and the underside 26 thereof (see FIG. 4), the finger tapering toward the front end surface 24 by the fact that the topside 25 thereof leans obliquely downward/forward.

The finger 17, as well as the bracket 19 positioned under the finger 17, has a width or thickness (determined as the distance between the pairs of opposite side surfaces 20 and 23, respectively) that is smaller than the diameter of the cutting edges 3. In other words, the finger, as well as the bracket, is housed in a groove generated by the cutting insert, the width of which is determined by the diameter of the cutting edge 3.

In order to press and clamp the cutting insert 2 against the insert seat 21, a tightening element 27 is included in the tool, which in this case is a pressure screw. The pressure screw is fitted with the male thread thereof in engagement with a female thread in a through hole in the upper portion 28 of the tightening part 8, the free end of the screw being pressed against a shoulder surface 29 on the fixing part 6. Upon tightening of the screw, a force is applied to the tightening part 8, which forces the tightening part 8 to pivot around the joint 15 so that the finger 17 distinctly presses the cutting insert 2 against the insert seat 21.

With reference to FIGS. 2-7, inside the basic body 1, a coupling member is fitted in the form of a pipe piece 30, which has the purpose of allowing transfer of high-pressure cooling liquid to the pivotably movable tightening part 8. In this case, the pipe piece is fitted in two co-operating cavities 31, 32 (see FIG. 4) formed in the tightening part 8 and the support part 7, respectively. Advantageously—but not necessarily—the pipe piece 30 as well as the two cavities 31, 32 have a cylindrical basic shape, the cavities being drilled bores. The first cavity 31 in the tightening part 8 is closed at the upper end thereof by an end wall 33 and opens in the underside of the tightening part via a lower opening 34. However, the second cavity 32 extends all the way through the support part 7, viz. from an upper opening 35 adjacent to the horizontal gap 9, and a lower opening 36 in the underside of the support part 7. When the tightening part 8 is unloaded, the cylindrical inner surfaces of the two cavities are concentric with a common axis C. Thus, in the example shown, the space formed by the cavities 31, 32 opens in the downward direction, wherein the pipe piece 30 can be inserted from below. In order to keep the pipe piece in place after the installation, a stopping element 37 (see FIG. 2) is used, which in this case is a screw, the male thread of which is tightened in a threaded hole in the basic body and the head of which is accessible from outside.

Figure 3:
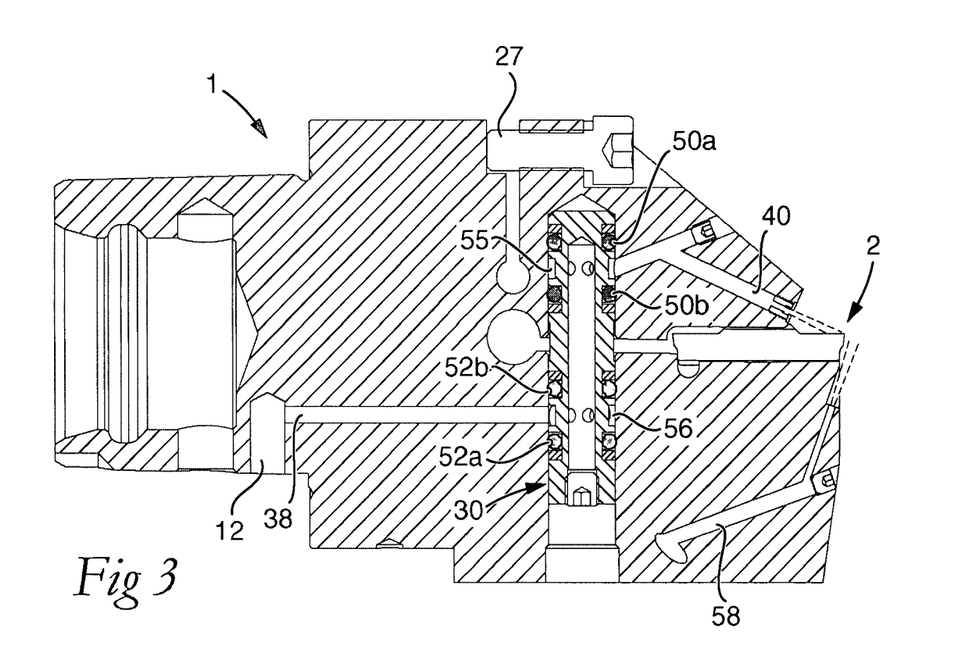
FIG. 3 is a central longitudinal section through the basic body of the tool having a cutting insert, a coupling member in the form of a pipe piece, and a tightening screw fitted in the basic body.
Figure 4:
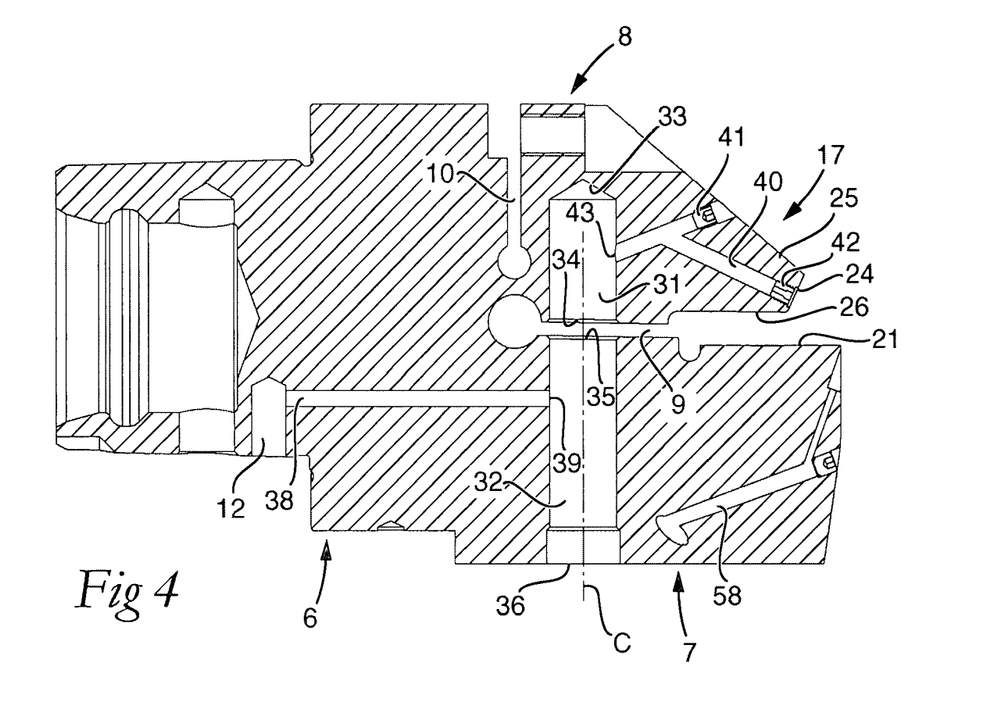
FIG. 4 is a longitudinal section corresponding to FIG. 3, in which the cutting insert, the pipe piece, and the tightening screw have been removed.

As illustrated in FIGS. 3 and 4, an internal channel 38 extends between an inlet 12 in the rear fixing part of the basic body and the front support part 7, and mouths in the cavity 32 in an outlet designated 39. This channel 38 has the purpose of feeding cooling liquid to the cavity 32 to be forwarded to the interior of the pipe piece 30. Between the upper cavity 31 inside the tightening part 8 and the free end 24 of the finger 17, a second channel extends, which is generally designated 40 and which is composed of two bores drilled at an angle to each other, one of which is sealed by means of a plug 41 and the other of which includes a high-pressure nozzle 42 in the immediate vicinity of the free end of the finger 17. The nozzle is situated in the outlet of the channel 40. Via an inlet 43, the channel 40 mouths in the cylindrical inner surface of the cavity 31.

Figure 5:
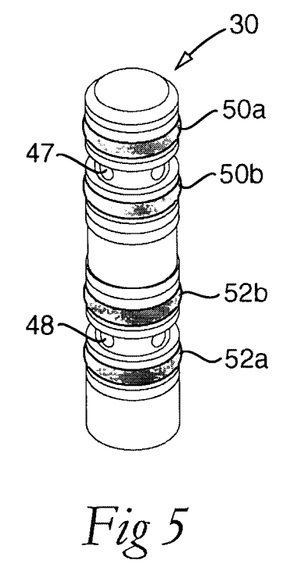
FIG. 5 is an enlarged perspective view showing the pipe piece having two pairs of fitted sealing rings.
Figure 6:
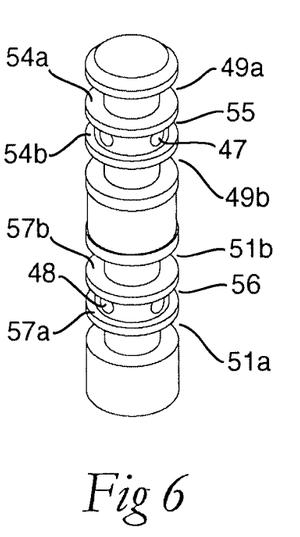
FIG. 6 is a corresponding perspective view showing the pipe piece without sealing rings.
Figure 7:
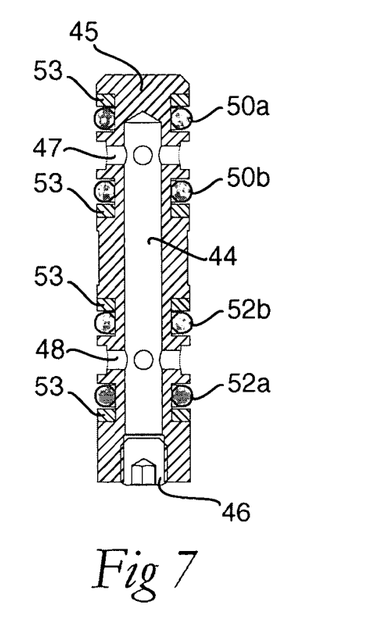
FIG. 7 is a longitudinal section through the pipe piece according to FIG. 5.

Reference is now made to FIGS. 5-7, which illustrate the nature of the pipe piece 30. Inside the pipe piece, there is a central, cylindrical hole 44, which extends from a permanently closed wall 45 at the one end of the pipe piece to an opening sealed by a dismountable plug 46 at the opposite end of the pipe piece. In practice, the hole 44 is accomplished by drilling. Between the central hole 44 and the outside of the pipe piece, a number of radial holes extend, which are arranged in two axially spaced-apart sets. In a first set, a plurality of (in this case four) holes 47 are included in the vicinity of the permanently closed end of the pipe piece, while a second set of holes 48 is situated closer to the opposite end of the pipe piece. Adjacent to the radial holes 47, ring-shaped grooves 49a, 49b are formed in the envelope surface of the pipe piece for the receipt of a sealing ring 50a, 50b each. Correspondingly, grooves 51a, 51b are formed adjacent to the radial holes 48 for the receipt of sealing rings 52a, 52b. Although the individual sealing ring could be applied alone in a groove of a suitable width, in this case the individual sealing ring is fitted together with a particular support ring 53 (see FIG. 7), which gives the sealing ring a good capability of resisting high pressure. In practice, the individual sealing ring may include rubber (or a rubber-like material) having a relatively great stiffness (e.g., 70-90 Shore), while the support ring 53 may be a plastic material having a greater hardness. In this connection, it should be pointed out that the proper pipe piece suitably consists of metal, such as steel, which easily can be machined by turning and drilling.

In FIG. 6, it is seen that two flanges 54a, 54b adjacent to the grooves 49a, 49b delimit an intermediate groove 55 in which the radial holes 47 mouth. In an analogous way, an intermediate groove 56 is delimited by flanges 57a, 57b adjacent to the grooves 51a, 51b, the radial holes 48 mouthing in the intermediate groove 56. The outer diameter of the flanges 54, 57 is smaller than the outer diameter of the sealing rings 50, 52 and should not exceed the outer diameter of the support rings serving as an abutment for the sealing rings. In each pair of co-operating sealing rings, the rings should, in this case, be uniform to afford equally large contact areas to the cooling liquid fed out into the ring-shaped space between the rings.

When the tightening part 8 (refer again to FIGS. 1-4) is unloaded in order to allow insertion of the cutting insert 2 between the underside 26 of the tightening finger 17 and the insert seat 21 on the topside of the bracket 19, the vertical distance between the surface 26 and the insert seat 21 is maximal. When the cutting insert has been brought in between the tightening finger and the insert seat, the play between the topside of the cutting insert and the underside of the clamping finger is limited and may in practice be within the range of 0.2-0.5 mm. When the tightening part 8 after that is brought to pivot around the elastic joint 15 by the tightening screw 27, the free end of the clamping finger 17 will move a corresponding distance to be pressed against the cutting insert and clamp the same against the insert seat 21. In other words, the motion between the tightening part and the support part is very limited already out at the free end of the tightening finger. This motion is further reduced in the direction inward toward the joint 15. For this reason, the pipe piece 30 has been placed as near the joint 15 as possible. Therefore, in the area where the pipe piece is situated, the relative motion between the tightening part and the support part is limited to a few tenths of a millimeter, which means that the angle divergence between the upper and lower cavities 31, 32 will be very small. Nevertheless, the outer diameter of the pipe piece 30 (or of the support rings 52) should be somewhat smaller than the inner diameter of the cavities 31, 32. Thus, the outer diameter of the pipe piece and/or of the individual support ring should be 0.1-0.8 mm smaller than the inner diameter of the cavities.

When the cutting insert has been fixed in the way described above by tightening the tightening screw 27, supply of cooling liquid to the cutting insert can be commenced. Thus, from the machine in which the tool is fitted, cooling liquid can be fed via the channel 38, more precisely from the inlet 12 thereof to the outlet 39 and further into the ring-shaped space, which is delimited by the groove 56 and the inside of the cavity 32, and which is sealed by the sealing rings 52a, 52b. From this ring space, the liquid is led into the central hole 44 of the pipe piece via the lower radial holes 48 to be fed out again via the upper radial holes 47. Upper radial holes mouth in an additional ring-shaped space formed by the groove 55 and the inside of the cavity 31. From here, the liquid is fed further via the channel 40 formed in the tightening part 8, more precisely from the inlet 43 thereof to the outlet in which the nozzle 42 is fitted. In practice, the pressure in the liquid may be very high, e.g., of the order of 400-1000 bar. However, in spite of the fact that the pressure may be high, no compressive forces, which could jeopardize the fixation of the cutting insert, is applied to the tightening part 8. Thus, the liquid pressure in the ring space between the sealing rings 50a, 50b will act in two opposite directions against the same. Because the sealing rings and the shoulders in the form of the support rings 53 co-operating with the same are uniform, i.e., have the same dimensions, the downwardly directed force acting against the lower sealing ring 50b will become as great as the upwardly directed force acting against the upper sealing ring 50a. In other words, the compressive forces will outbalance each other so that no forces of any consequence caused by the liquid pressure are applied to the proper pipe piece 30.

The same condition as has been described above in respect of the pressure in the upper groove 55 also applies in respect of the pressure in the lower groove 56.

The high-pressure liquid can be transferred from the support part 7 of the basic body to the movable tightening part 8, without the pipe piece 30 or the two parts 7, 8 being subjected to liquid-pressure forces, which could alter the compressive force by which the tightening part 8 keeps the cutting insert 2 pressed against the appurtenant insert seat. Expressed in other words, the pipe piece 30 may be said to be free-flowing in the appurtenant cavities 31, 32, although the same of course is kept in place mechanically.

The tool according to the invention includes a lower channel system (a part of which is outlined at 58 in FIGS. 3 and 4) by which the cutting insert can be cooled also from below, more precisely via a nozzle that is fitted in the front-end surface 22 and points up at a steep angle toward the cutting insert. However, such undercooling of the cutting insert is of secondary importance in comparison with the improved overcooling allowed by the invention. Thus, the nozzle 42 fitted centrally in the front end of the tightening finger 17 can direct a distinct liquid jet toward the topside of the cutting insert adjacent to the cutting edge. By locating the nozzle in a suitable position, the liquid jet can be brought to impinge on the cutting insert at an ideal impact angle, which in practice is within the range of 12-15°. In such a way, a hydraulic wedge is formed between the chip and the cutting insert, which contributes to loosen the chip and counteracts sticking to the cutting insert. The high pressure of the liquid also contributes to make the chip evacuation more effective from the generated groove in the workpiece.

The above-mentioned impact angle of the liquid jet may of course deviate from the given interval. However, the angle should be within the range of 5-30°, suitably 10-20°.

Figure 8:
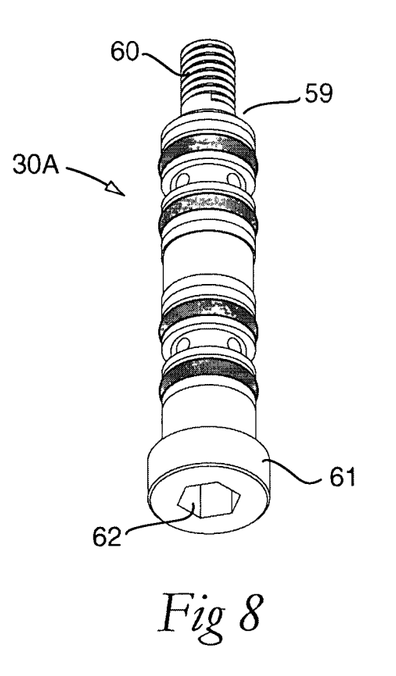
FIG. 8 is a bottom perspective view showing an alternative embodiment of a pipe piece according to the invention.
Figure 9:
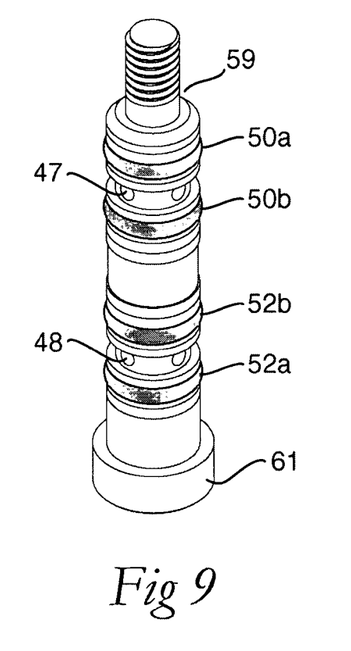
FIG. 9 is a top perspective view of the pipe piece according to FIG. 8.

In FIGS. 8 and 9, an alternative embodiment of a pipe piece 30A according to the invention is shown. In this case, the pipe piece is at one end thereof formed with a pin 59 having a male thread 60. Simultaneously, the opposite end of the pipe piece is formed with a ring-shaped shoulder or flange 61, besides which a key grip 62 is formed in the end surface of the pipe piece. In a modified embodiment of the tool, the pipe piece 10A shown in FIGS. 8 and 9 could replace the pipe piece 30 described above while fulfilling the function as a tightening element. Thus, the male thread 60 could be tightened in a hole that is formed with a female thread and mouths in the end surface of the upper cavity 31, besides which the flange 61 can be pressed against a co-operating support surface in the lower part of the cavity 32. In this connection, the pipe piece 30A may serve as a tension screw by which the tightening part 8 can be forced to pivot and press the cutting insert against the insert seat. In other words, the previously described pressure screw 27 can be spared.

The invention is not limited only to the embodiments described above and shown in the drawings. Thus, the invention may be applied to any tools of the type that makes use of a tightening part pivotable around a joint for the fixation of a cutting insert. Among other things, the invention may advantageously be applied to such tools intended for parting and grooving operations, the tightening and support parts of which in their entirety are comparatively thin plates that project from a rear fixing part having an arbitrary shape. In addition to turning tools and other fixed tools, the invention may be applied to certain rotatable tools, such as slitting cutters. Furthermore, instead of genuine liquids, other fluids for chip breaking and/or cooling of the cutting insert may be used, e.g., different types of gas, or mixtures of gas and liquid. Furthermore, the fluid-transferring pipe piece or the coupling member could be arranged between the tightening part and the fixing part, instead of between the tightening part and the support part, such as has been exemplified above. In such cases, the pipe piece would intersect the vertical gap instead of the horizontal gap. In this connection, it should be emphasized that the pipe piece does not necessarily have to be made with two pairs of axially spaced-apart sealing rings. Thus, a pair of pressure-balancing sealing rings is generally only required in the pivotably movable tightening part, while the supply of cooling fluid to the section of the pipe piece positioned in the support part (or the fixing part) may be effected in another way. However, for reasons of manufacturing technique, the exemplified solution is preferred, because the manufacture and installation of the pipe piece will be easy when two pairs of sealing rings are used. It should also be pointed out that the provided solution does not require that the two sealing rings in co-operating pairs of sealing rings are fitted on the outside of the pipe piece. Thus, it is possible to delimit and seal the ring-shaped space, through which the cooling fluid should pass out into the outlet channel of the tightening finger, by sealing rings fitted on the inside of the cavity in the tightening part. Thus, importantly, the counter-directed forces against the sealing rings that are generated by the pressure in the ring space balance out each other in such a way that no forces of any consequence caused by the liquid pressure are applied to the tightening element. It should also be mentioned that the tightening part may be formed with more than one channel to allow jetting of cooling fluid in a plurality of jets directed at different angles to the cutting insert.

Figure 10:
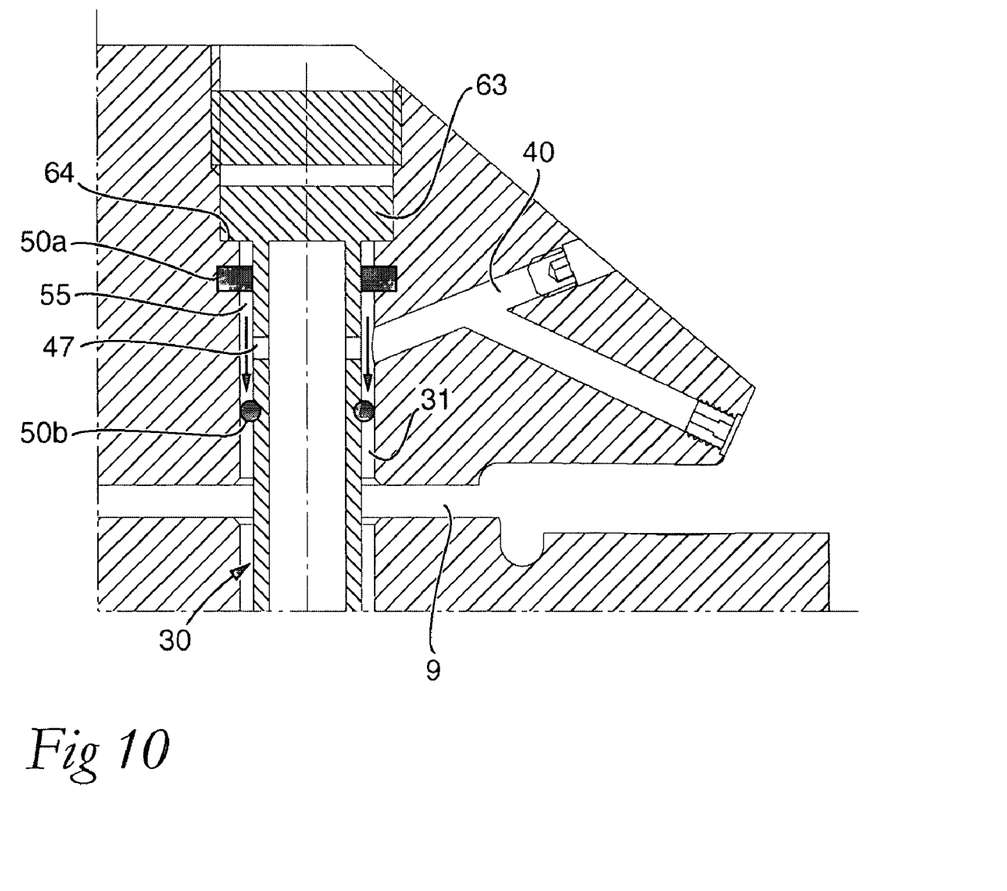
FIG. 10 is a schematic section showing an additional alternative embodiment of the invention.

In FIG. 10, an embodiment is schematically illustrated according to which the liquid pressure may be utilized to apply a tightening force to the tightening part 8. In this case, one of the sealing rings, viz. the upper sealing ring 50a, is fixedly fitted in the inside of the cavity 31, while the other sealing ring 50b is fitted in the envelope surface of the pipe piece 30 in the way previously described. Furthermore, the pipe piece 30 is formed with a driver 63, which in this case is in the form of an upper, piston-like flange, which is pressable against a shoulder surface 64 formed adjacent to the cavity. When high-pressure cooling liquid is led into the ring-shaped space 55 between the sealing rings 50a, 50b, the sealing ring 50b will be subjected to a downwardly directed force (see the arrow) that aims to pull the pipe piece in the downward direction. In this connection, the driver 63 applies a downwardly directed force to the tightening part 8. This force may be utilized either as a complement to the tightening force generated by the traditional tightening element, e.g., the shown tightening screw, or to alone provide the pivoting of the tightening part requisite for the clamping of the cutting insert. In other words, also in this case, the pipe piece could alone serve as a tightening element in analogy with the embodiment according to FIGS. 8 and 9.

Furthermore, the invention is applicable to such tools that in one and the same basic body includes more than one tightening part, e.g., two diametrically opposed tightening parts for the fixation of a cutting insert each, which are located in opposite insert seats on a common support part.

While the invention has been disclosed with reference to certain preferred embodiments, numerous modifications, alterations, and changes to the described embodiments are possible without departing from the sphere and scope of the invention, as defined in the appended claims and their equivalents thereof. Accordingly, it is intended that the invention not be limited to the described embodiments, but that it have the full scope defined by the language of the following claims.

What is claimed is:

1. A tool for chip removing machining, comprising: a replaceable cutting insert and a basic body, the basic body including,
    a rear fixing part;
    a front supporting part having an insert seat; and
    a tightening part spaced apart from the front supporting part by a first gap and from the rear fixing part by a second gap, the tightening part being connected to the basic body via a joint around which the tightening part is pivoted to press the cutting insert against the insert seat by a front finger;
    the rear fixing part including a first channel having an inlet and an outlet for feed of a fluid toward the cutting insert;
    wherein the tightening part includes an internal, second channel that extends between an inlet and an outlet; and
    wherein a hollow coupling member extends between the tightening part and one of the rear fixing part and the front supporting part while bridging one of the first gap and the second gap to establish a fluid communication path between the outlet of the first channel and the inlet of the second channel.

2. The tool according to claim 1, wherein the joint is a long narrow, elastically resilient material portion that is left after forming of the first and second gaps.

3. The tool according to claim 1, wherein the tightening part is pivotable by means of a tightening element included in the basic body.

4. The tool according to claim 1, wherein the coupling member is a pipe piece that projects into an internal cavity in the tightening part, and includes an internal hole and one or more radial holes, which mouth in the cavity in a space delimited between two axially spaced-apart, elastic sealing rings and in which the inlet of the second channel mouths.

5. The tool according to claim 4, wherein the two sealing rings are fitted in the envelope surface of the pipe piece and, together with the pipe piece, are movable in relation to the inside of the cavity.

6. The tool according to claim 4, wherein one of the sealing rings is fitted in the envelope surface of the pipe piece, and the other one in the inside of the cavity, the pipe piece including a driver, that cooperates with a holder-on in the tightening part.

7. The tool according to claim 4, wherein the pipe piece projects into a second cavity in a basic-body part cooperating with the tightening part, and includes one or more second radial holes that are spaced-apart from the first radial holes and mouth in the second cavity in a second, ring-shaped space between an additional pair of axially spaced-apart, elastic sealing rings, the outlet of the first channel mouthing in the second ring space.

8. The tool according to claim 7, wherein the pair of sealing rings delimiting the second ring space are fitted on the envelope surface of the pipe piece and are movable in relation to the inside of the second cavity.

9. The tool according to claim 4, wherein the pipe piece and the internal cavity have a cylindrical basic shape.

10. The tool according to claim 9, wherein a supporting shoulder or support ring on one side of an individual sealing ring has an outer diameter that is 0.1-0.8 mm smaller than the inner diameter of the cavity, while the individual sealing ring, in the unloaded state, has an outer diameter that is greater than the inner diameter of the cavity.

11. The tool according to claim 1, wherein the coupling member is situated closer to the joint than a free opening, spaced apart from the joint, in the gap.

12. The tool according to claim 7, wherein the second cavity extends continuously between an inner opening adjacent to the gap, and an outer opening through which the pipe piece is inserted.

13. The tool according to claim 12, wherein the pipe piece is kept in place in the cavities by means of a stopping element fitted in the support part and situated in the area of the outer opening.

14. The tool according to claim 1, wherein the second channel of tightening part mouths in a free end surface on the finger of the tightening part.

15. The tool according to claim 14, wherein a nozzle fitted in the second channel of the tightening part is arranged to direct a jet of fluid at an acute angle within the range of 5-30° to the cutting insert.

16. The tool according to claim 1, wherein the coupling member includes means to bring the tightening part to pivot about the joint.

17. The tool according to claim 1, wherein a pressure screw serves as a tightening element for pivoting the tightening part, the pressure screw extends between an upper portion of the tightening part and the rear fixing part, the coupling member extending between the tightening part and the support part while bridging the first gap.

18. The tool according to claim 1, wherein a tension screw serves as the tightening element for pivoting the tightening part, the tension screw extends between the tightening part and the support part, the coupling member extending between the tightening part and the rear fixing part.

19. A basic body for tools for chip removing machining, comprising:
    a rear fixing part;
    a front supporting part having a cutting insert seat; and
    a tightening part spaced apart from the front supporting part by a first gap and from the rear fixing part by a second gap, the tightening part being connected to the basic body via a joint around which the tightening part is pivoted to press a front finger toward the cutting insert seat;
    the rear fixing part including a first channel having an inlet and an outlet for feed of a fluid toward the cutting insert seat;
    wherein the tightening part includes an internal, second channel that extends between an inlet and an outlet; and
    wherein a hollow coupling member extends between the tightening part and one of the rear fixing part and the front supporting part while bridging one of the first gap and the second gap to establish a fluid communication path between the outlet of the first channel and the inlet of the second channel.

* * * * *